(12) United States Patent
Narayanan et al.

(10) Patent No.: US 8,584,021 B2
(45) Date of Patent: Nov. 12, 2013

(54) DISPLAYING FEED DATA

(75) Inventors: Raman Narayanan, Seattle, WA (US); Rajendra Vishnumurty, Bellevue, WA (US); Russell Songco, Seattle, WA (US); Ming Liu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 12/713,201

(22) Filed: Feb. 26, 2010

(65) Prior Publication Data

US 2011/0214086 A1 Sep. 1, 2011

(51) Int. Cl.
*G06F 3/00* (2006.01)

(52) U.S. Cl.
USPC ........................................ 715/751

(58) Field of Classification Search
USPC .......... 717/751, 752, 758, 772; 715/751, 752, 715/758, 772
See application file for complete search history.

(56) References Cited

U.S. PATENT DOCUMENTS

2006/0107231 A1* 5/2006 Matthews et al. ............ 715/788
2006/0236261 A1 10/2006 Forstall et al.
2007/0044029 A1* 2/2007 Fisher et al. .................. 715/762
2007/0219908 A1 9/2007 Martinez
2008/0040673 A1* 2/2008 Zuckerberg et al. .......... 715/745
2008/0071929 A1 3/2008 Motte et al.
2008/0147708 A1 6/2008 Read et al.
2009/0006523 A1 1/2009 Kordun et al.
2009/0049370 A1 2/2009 Faris et al.
2011/0088068 A1* 4/2011 Patnoe et al. .................. 725/61

OTHER PUBLICATIONS

Kruse, Matt, "RSS Feed Customizer: Improve the look, layout, and functionality of your iGoogle RSS feeds!", Retrieved at <<http://www.google.com/ig/directory?url=www.javascripttoolbox.com/gadget/rss/rss_dev.xml>>, Dec. 23, 2009, pp. 2.
"Static Rendering", Retrieved at <<http://www.addedvalues.org/help/miscellaneous/staticrendering>>, Dec. 23, 2009, pp. 3.

* cited by examiner

*Primary Examiner* — Thanh Vu
(74) *Attorney, Agent, or Firm* — Hope, Baldauff, LLC

(57) ABSTRACT

Concepts and technologies are described herein for displaying feed data. Feed data associated with a social networking service may be displayed in a multidimensional grid orientation that efficiently uses available display space, while improving the user experience. The feed data can be presented in a multidimensional grid orientation that leaves little empty display space, thus allowing efficient use of the display space. The feed data presented in the multidimensional grid orientation also can be dynamically updated when new feed data is received.

11 Claims, 12 Drawing Sheets

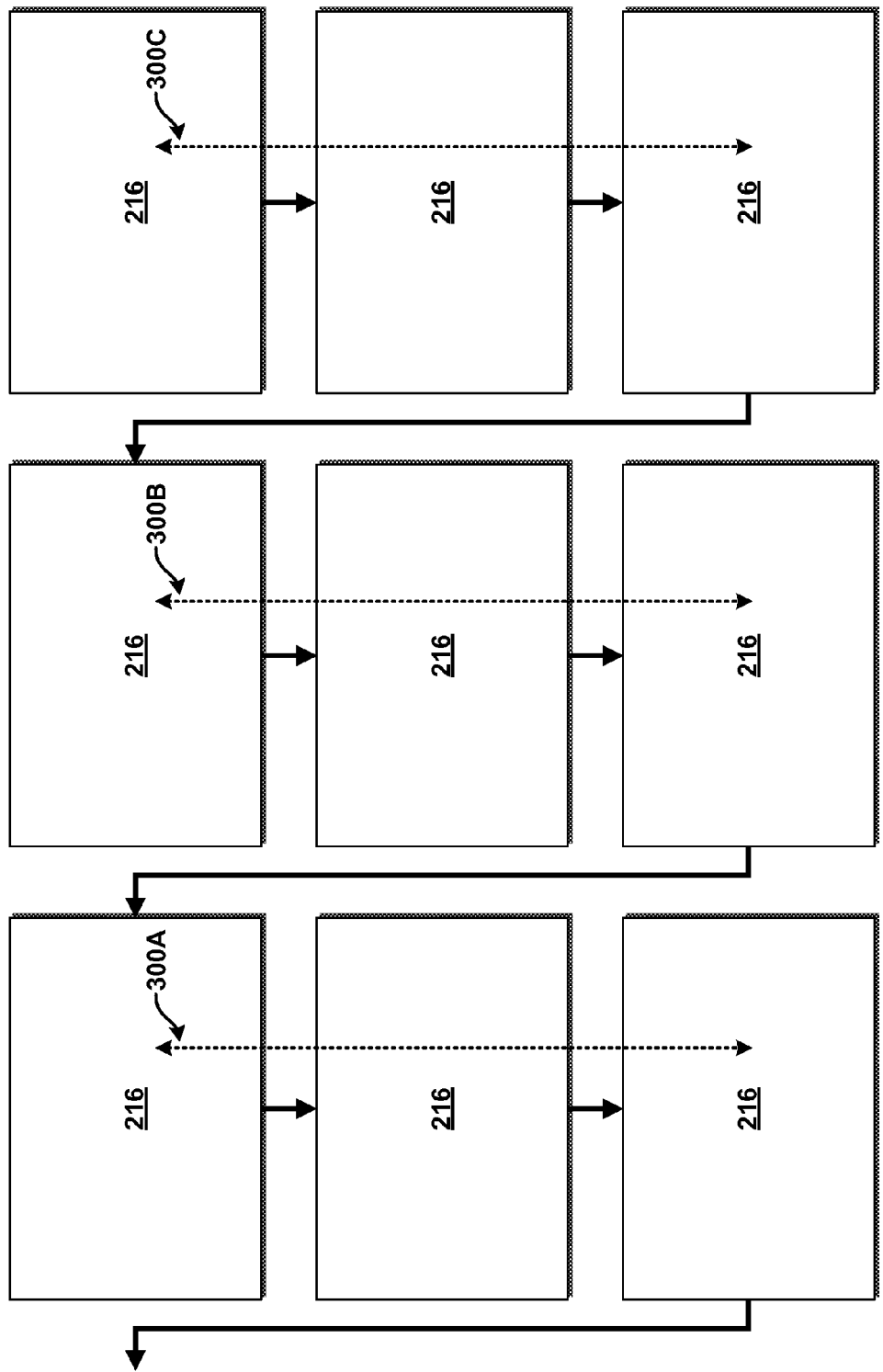

DISPLAYING FEED DATA

BACKGROUND

Social networking sites have become popular with Internet users. Users of social networking sites often have the ability to create and manage social networks that include other users of the social networking service. In connection with the social networking services, users may have the ability to update a status associated with a user account to inform members of their social network of a current thought, activity, event, or the like. Members of the user's social network can view the user's status and take other actions, if desired.

Some users of social networking sites have extensive social networks, and may view information relating to a large number of social networking accounts. By way of example, one or more members of a user's social network may update statuses, post photographs, post links, or the like. Similarly, members of the user's social network may submit data to the social networking service to reflect a thought, mood, or event, or to share information such as a link, a document, or another resource with other users. All of these data and other events, which may be collectively referred to herein as "feed data," may be viewable by the user at a given time. Because user interfaces for social networking services typically represent feed data in a vertically aligned orientation, wherein older events move down a vertical column, the viewable portion of the feed data is typically limited by the available vertical extent of a display device.

It is with respect to these and other considerations that the disclosure made herein is presented.

SUMMARY

Concepts and technologies are described herein for displaying feed data. The concepts and technologies disclosed herein can be employed to display feed data in a horizontal orientation that efficiently uses available display space. The feed data can be presented in a multidimensional grid orientation that leaves little or no empty space on a display, thus allowing efficient use of the display space. The feed data presented in the multidimensional grid orientation also can be dynamically updated.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-2D are user interface diagrams showing aspects of various exemplary user interfaces provided by an application program and a data rendering module disclosed herein in various embodiments.

FIGS. 3A-3C schematically illustrate aspects of dynamically updating displayed feed data, according to exemplary embodiments of the present disclosure.

DETAILED DESCRIPTION

Figure 1:
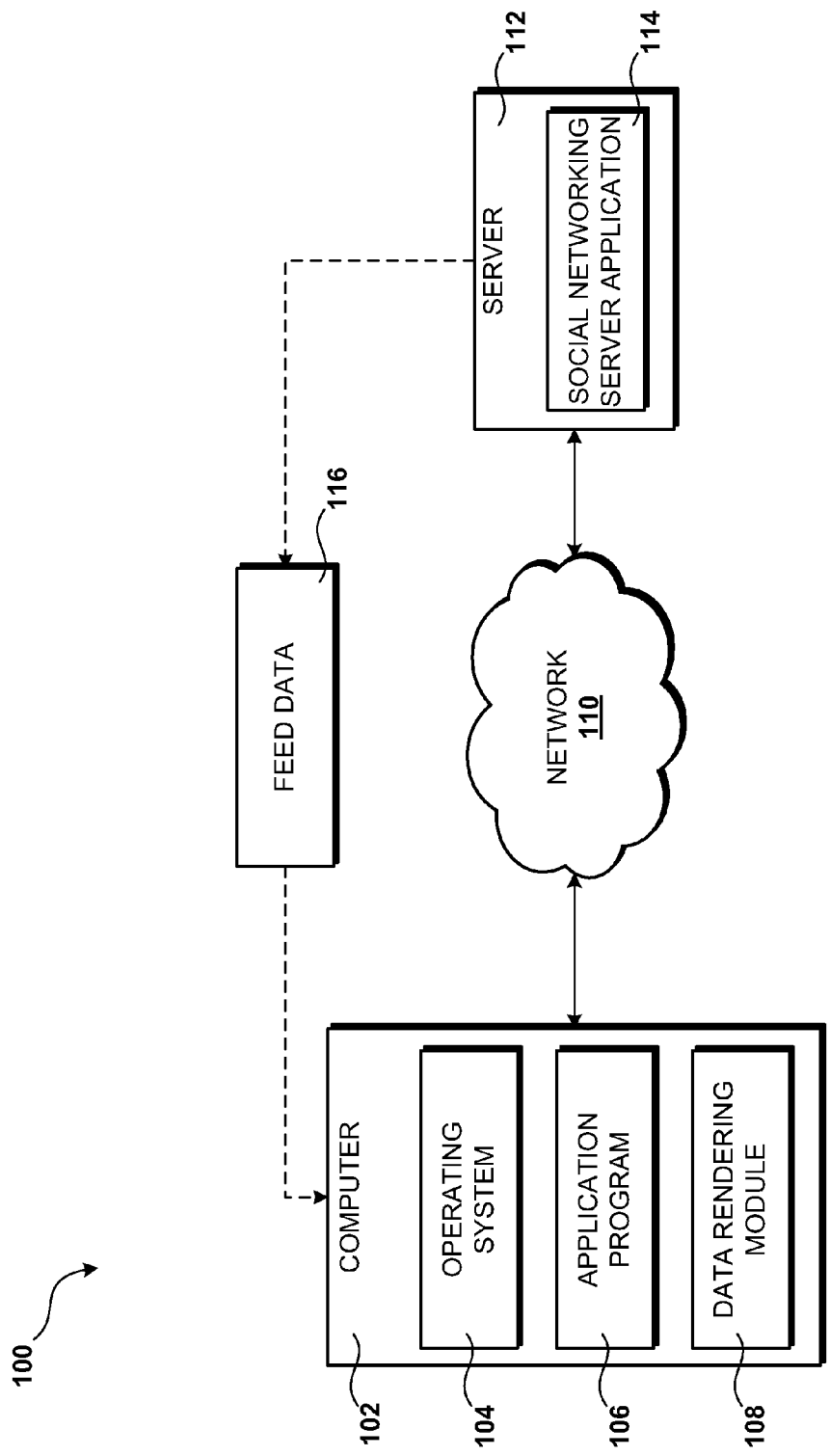
FIG. 1 is a system diagram illustrating an exemplary operating environment for the various embodiments disclosed herein.

The following detailed description is directed to technologies for displaying feed data, and for dynamically updating displayed feed data. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for displaying feed data, and for dynamically updating displayed feed data will be presented.

Referring now to FIG. 1, aspects of one operating environment 100 for the various embodiments presented herein will be described. The operating environment 100 shown in FIG. 1 includes a computer 102 configured to execute an operating system 104, an application program 106, and a data rendering module 108. According to various embodiments, the computer 102 is a standard desktop or laptop personal computer system. It should be appreciated, however, that the computer 102 may include other types of computing systems, including a server computer, a handheld computer, a netbook computer, a tablet computer, a set-top box or unit ("STB" or "STU"), an embedded computer system, a video game console, a personal digital assistant, a mobile telephone, or another type of computing device known to those skilled in the art. An exemplary architecture of the computer 102 will be described in additional detail below with reference to FIG. 7.

The operating system 104 is a computer program for controlling the operation of the computer 102. The application program 106 is an executable program configured to execute on top of the operating system 104. In one embodiment, the application program 106 is a social networking client program. It should be appreciated, however, that the embodiments presented herein may be utilized by other types of programs. For example, in other embodiments, the application program 106 is a web browser accessing a website provided by a social networking service.

The computer 102 may be connected to one or more networks 110, and may operate in conjunction with other computing systems on or in communication with the network 110 to provide the functionality described herein. In some embodiments, the computer 102 communicates with a server 112 that operates on, or in communication with, the network 110. In some embodiments, the server 112 includes a social networking server application 114, which provides a social networking service to users via a social networking site generated by the social networking server application 114. In the illustrated example, the server 112 is a web server accessible via the Internet, and provides a social networking service and/or social networking service data, such as feed data 116, to users or devices connecting to the server 112 and/or the social networking site generated by the social networking server application 114. In some embodiments, programs also can connect to the server 112 via an application programming interface ("API") (not illustrated), a back end interface (not illustrated), or via other connections and/or interfaces (not illustrated).

As will be described in greater detail below, a data rendering module 108 executes in conjunction with the application program 106 to provide the computer 102 with the functionality disclosed herein for displaying feed data 116 received from the server 112. While the data rendering module 108 is illustrated in FIG. 1 as a distinct entity within the computer 102, it should be understood that the functionality disclosed herein as being performed by the data rendering module 108 may be provided by the application program 106 or another hardware and/or software component of the computer 102. Additionally, or alternatively, some or all of the functionality disclosed herein as being performed by the data rendering module 108 may be provided by the social networking server application 114 operating on the server 112, alone or in combination with the computer 102. According to other implementations, the data rendering module 108 operates in conjunction with the operating system 104 and/or the application program 106 to display feed data 116. Other implementations are possible and are contemplated.

As will be explained in more detail below, concepts and technologies of the present disclosure allow a user of a social networking service provided by the server 112 to retrieve, format, and display feed data 116 associated with the social networking service in an orientation that makes more efficient use of a display connected to the computer 102. In particular, a user can access a server 112 hosting a social networking site associated with a social networking service using the computer 102. The computer 102 can access feed data 116 corresponding to the user's social network.

As discussed briefly above, feed data 116 may include, but is not limited to, data associated with a social networking service, and can indicate news, thoughts, moods, events, and other information associated with a social networking service and/or users of the social networking service. Additionally, the feed data 116 can include information relating to links, photographs, graphics, animations, documents, videos, and/or other resources, all of which may be shared or referenced by users of a social networking service, advertisers affiliated with or advertising through a social networking service, and/or other entities. Thus, the feed data 116 may include, but is not limited to, status updates, links, photos, videos, and/or other information (hereinafter "status updates") periodically posted by members of a user's social network. The feed data 116 provided to the user can be provided by the social networking server application 114, or by another application and/or interface operating at the server 112. Although not illustrated in FIG. 1, it should be appreciated that the server 112 can include, or can be in communication with, data storage devices for storing the feed data 116 provided to the user, as well as other hardware and/or software.

The feed data 116 is provided to the computer 102 according to generally known methods via the network 110. The data rendering module 108 includes computer readable instructions, the execution of which cause the computer 102, or a processor thereof (not illustrated in FIG. 1), to analyze the feed data 116 to determine what portions of the feed data 116 should be displayed. The data rendering module 108 can be configured to make these determinations according to desired parameters and/or preferences. Thus, the data rendering module 108 can determine to display some or all of the retrieved feed data 116. In some embodiments, any portions of the feed data 116 that the data rendering module 108 determines are not to be displayed can be stored at a data storage device (not illustrated in FIG. 1) associated with the computer 102.

In some embodiments, only a portion of the feed data 116 is initially retrieved from the server 112, as determined and/or specified by the data rendering module 108. In some embodiments, additional portions of the feed data 116 may be retrieved from the server 112 if a user enters a command at the computer 102 to view a detailed view of the feed data 116, as will be described in more detail below. The data rendering module 108 formats the retrieved feed data 116 into a desired format, which may include an abbreviated or compressed view of the feed data 116. The formatted feed data 116 is passed to the application program 106 for display at the computer 102.

The data rendering module 108 and/or the application program 106 include computer readable instructions for generating a user interface ("UI") display including the formatted feed data 116. In some embodiments, the data rendering module 108 and/or the application program 106 are configured to generate UI controls for retrieving detailed views of some or all of the displayed feed data 116. Thus, in the case of a status update for a social networking service, the data rendering module 108 and/or the application program 106 are configured to format the feed data 116 into a viewable status update, and to generate a UI control for accessing a detailed view associated with the viewable status update.

In some embodiments, the viewable status update is an abbreviated or compressed format of a full status update that can be viewed by a user of a social networking service, as mentioned above. Thus, the UI controls generated by the data rendering module 108 and/or the application program 106 can be formatted to correspond to actions for retrieving additional feed data 116 associated with the viewable status update. If a user enters a command to retrieve a detailed view of the displayed status update, e.g., by selecting an appropriate UI control, the computer 102 can retrieve and format the additional feed data 116 corresponding to the displayed status update, as mentioned above.

The data rendering module 108 and/or the application program 106 also are configured to receive a notification from the server 112, or the social networking server application 114 executing thereon, that new feed data 116 has been received at the server 112. In some embodiments, the data rendering module 108 and/or the application program 106 query the server 112 periodically to check for new feed data 116, and in some embodiments, the server 112 "pushes" new feed data 116 to the computer 102. In either implementation, the data rendering module 108 and/or the application program 106 are configured to format the new feed data 116 and dynamically update the feed data 116 displayed by the computer 102 to accommodate the new feed data 116 received from the server 112. According to embodiments disclosed herein, the data rendering module 108 and/or the application program 106 provide event-based updating of the displayed feed data 116, while maintaining the viewed feed data 116 in a desired orientation.

It should be appreciated that the operating environment 100 illustrated in FIG. 1 is one embodiment of a suitable operating environment. Other operating environments for providing the functionality disclosed herein may be utilized. Additional details regarding the operation of the application program 106 and the data rendering module 108 will be provided below with reference to FIGS. 2A-7.

Figure 2A:
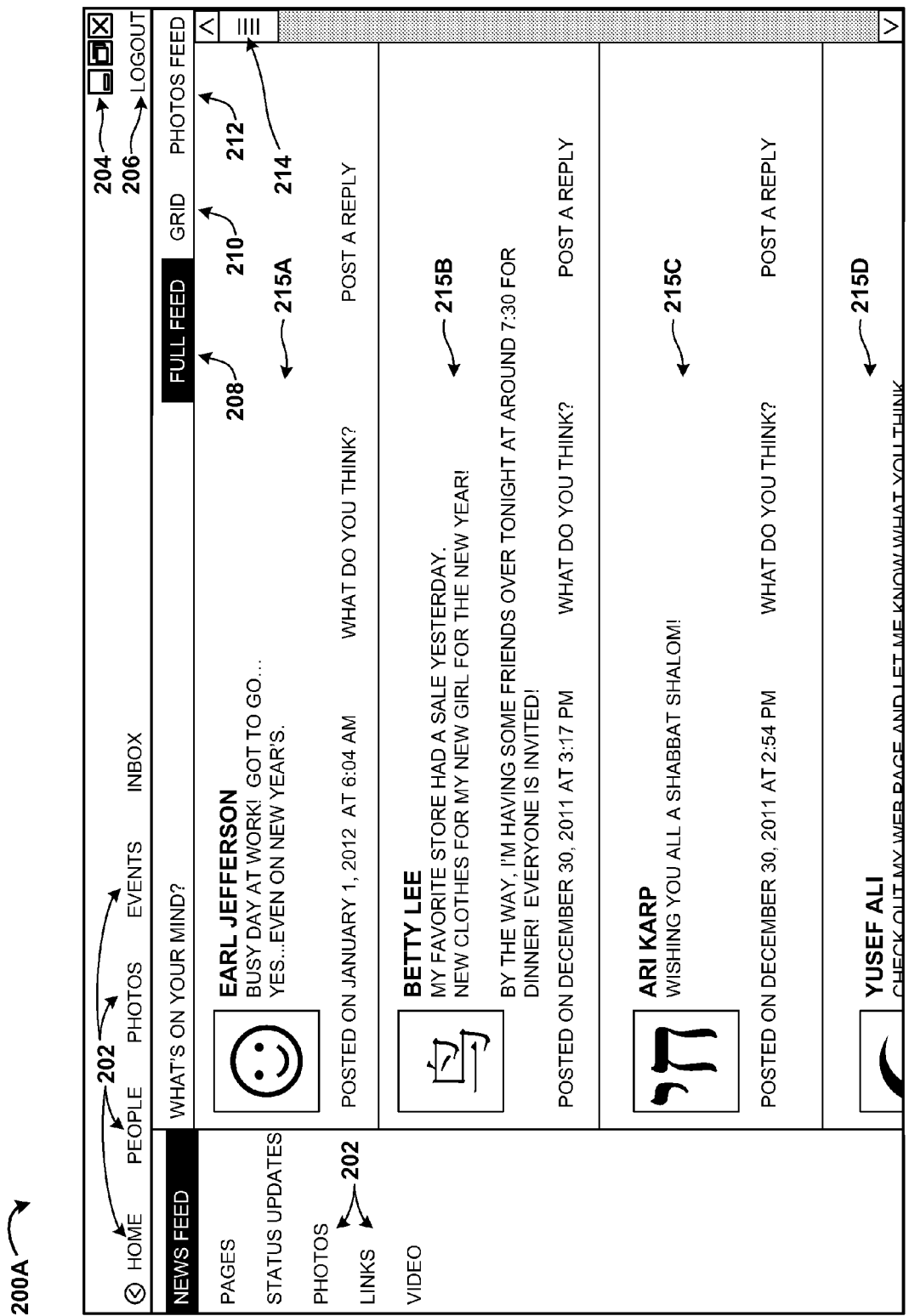

Turning now to FIG. 2A, a user interface diagram showing aspects of a user interface provided by the application program 106 in one embodiment will be described. In particular, FIG. 2A shows a screen display 200A generated by the application program 106 according to one particular implementation presented herein. In this implementation, the application program 106 is a program for interacting with a social networking website provided by the server 112. In other embodiments, the application program 106 is a stand-alone application that is configured to interface with an API exposed by the server 112 hosting a social networking site. In some embodiments, the application program 106 is a web browser accessing a social networking site provided by the server 112. Thus, it should be appreciated that the user interface diagrams illustrated in FIGS. 2A-2D are merely illustrative, and that the embodiments presented herein may be utilized with many different types of user interfaces provided by many different types of application programs 106.

The screen display 200A shown in FIG. 2A includes various UI controls for interacting with the social networking service. The display 200A includes a display of the feed data 116 associated with a social networking account, features associated with the social networking service, other UI controls and data, and the like. In particular, the illustrated screen display 200A includes navigation controls 202, the selection of which cause the computer 102 to display controls for utilizing functionality provided by the social networking site for modifying an account associated with the social networking site. The illustrated navigation controls 202 include, but are not limited to, UI controls to update a user's status, navigate to various pages, filter data to provide various views, access a messaging service provided by the social networking site, view photos, view videos, combinations thereof, and the like.

The illustrated screen display 200A further includes window controls 204 for controlling the behavior of the program window, a logout UI control 206 for "logging out" of the accessed user account, and display controls. The illustrated display controls include a UI control 208, the selection of which causes the computer 102 to display feed data 116 in a vertical orientation, a UI control 210, the selection of which causes the computer 102 to display the feed data 116 in a multidimensional grid orientation, and a UI control 212, the selection of which causes the computer 102 to filter the feed data 116 to display photographs or other graphics included in the feed data 116. For purposes of this disclosure, and the appended claims, the phrase "multidimensional grid orientation" is used to refer to an orientation in which the feed data 116 is arranged vertically as well as horizontally, as illustrated below in FIG. 2B. In the context of status updates, the multidimensional grid orientation allows more than one status update to exist in at least two directions, e.g., horizontally and vertically. The arrangement illustrated in FIG. 2A is not a multidimensional grid orientation, as the data is arranged in rows that allow more than one status update to exist only in the vertical direction.

In the illustrated embodiment, the user has selected the UI control 208 to display the feed data 116 in the strictly vertical orientation. Thus, the UI control 208 is illustrated as highlighted, and the feed data 116 is being displayed on the screen display 200A in the vertical orientation. Because the feed data 116 is being displayed in the vertical orientation, only a relatively small portion of the feed data 116 is being displayed by the computer 102 due to the consumption of the limited amount of available display space. As such, the illustrated screen display 200A further includes a scroll bar 214 for "scrolling" the displayed page to access additional portions of the feed data 116.

As explained above, feed data 116 might include status updates, links, photos, videos, and/or other information (hereinafter "status updates") periodically posted by members of a user's social network. The screen display 200A is illustrated as displaying four exemplary status updates 215A-D (collectively, the status updates 215). Each of the status updates 215 can include a variety of information that can be generated by the members of a social network, by the server 112, by the social networking server application 114, and/or by other applications, systems, and devices. In the illustrated embodiment, each status update 215 includes graphics such as a photo or other art selected by the user associated with the status update 215, content such as a status, link, message, or the like, information describing when the status update 215 was posted by the user, options to vote upon or comment upon the status update 215, other content (not illustrated), combinations thereof, and the like. As mentioned above, the displayed status updates 215 are only a portion of the status updates existing in the user's feed. The user is able to view additional status updates by way of the scroll bar 214 or other UI controls that may be used by a user to "scroll down" to view additional status updates information.

The illustrated screen display 200A may be displayed when the application program 106 is initialized, when a social networking site is loaded, and/or when triggered or accessed by a command received at the computer 102, e.g., by a user selecting the UI control 208, as explained above. It should be understood that the illustrated screen display 200A, as well as the feed data 116 illustrated and/or described with reference thereto, is merely illustrative of a contemplated embodiment of the present disclosure. As such, the format of the screen display 200A, and the UI controls illustrated and described herein, should not be construed as being limiting in any way.

The application program 106 may receive many different types of commands. For example, the application program 106 may receive commands as mouse clicks and/or key entries on or at UI controls, e.g., the illustrated UI controls 202, 204, 208, 210, 212, 214, hot keys and/or keystroke sequences, voice commands, and/or the like. Therefore, as utilized herein, the term "command" encompasses any request to perform functionality that is received at the computer 102.

Figure 2B:
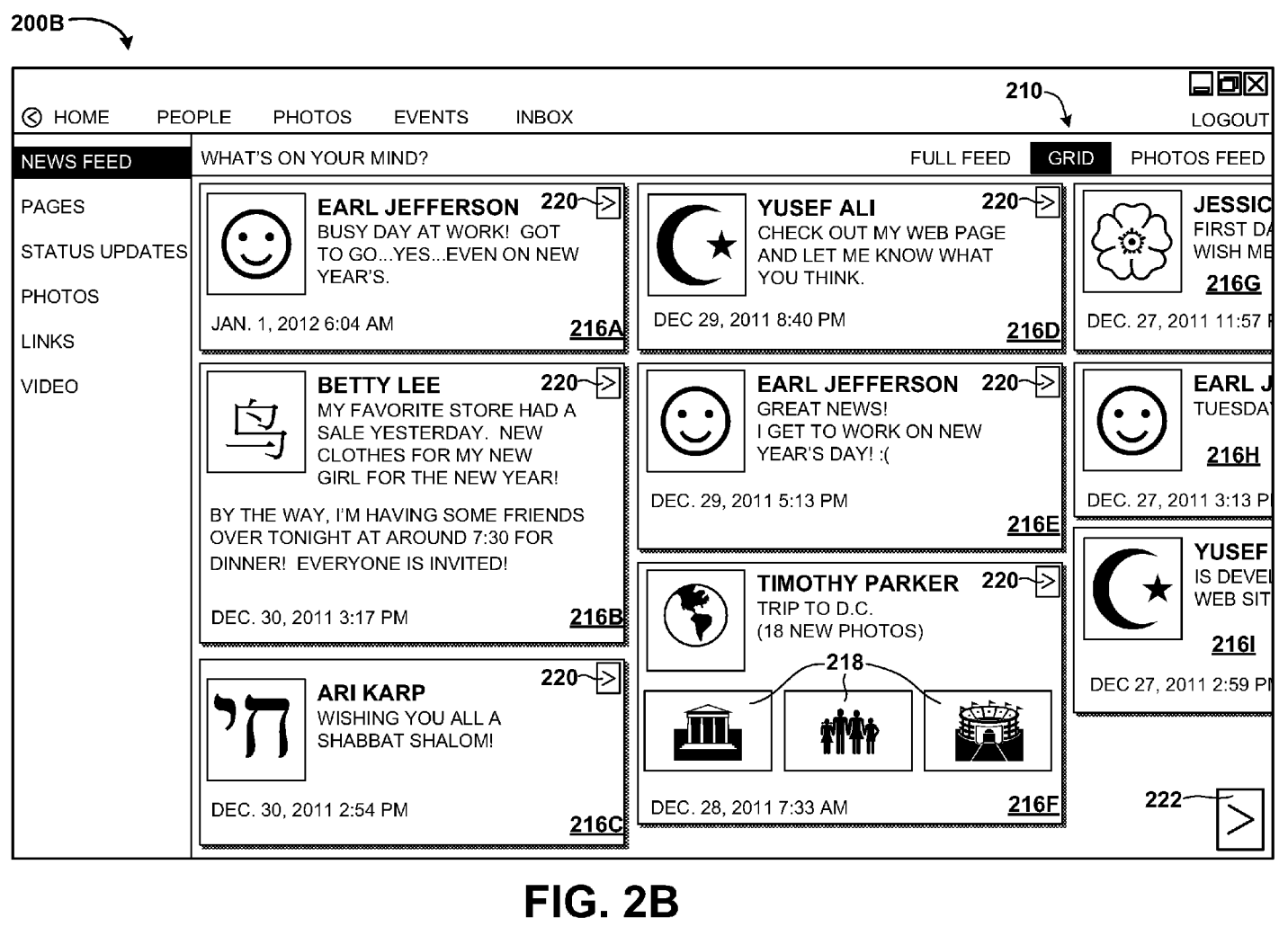

Referring now to FIG. 2B, a user interface diagram showing aspects of a user interface provided by the application program 106 and the data rendering module 108 in one embodiment will be described. In particular, FIG. 2B shows a screen display 200B generated by the application program 106 and the data rendering module 108. The screen display 200B can be displayed, for example, in response to a user selecting the UI control 210 to display the feed data 116 in a multidimensional grid orientation. As such, the UI control 210 is highlighted, although this is not necessary. The screen display 200B includes status updates 216A-I. The status updates 216A-D correspond to the status updates 215A-D of FIG. 2A, though the status updates 216A-D do not necessarily include all of the feed data 116 illustrated in the status updates 215A-D of FIG. 2A.

In FIG. 2B, each of the status updates 216 is illustrated as a cell, i.e., a unit or item such as, for example, a graphical window, balloon, box, icon, or the like, within which the feed data 116 is reproduced. In FIG. 2B, each of the status updates 216 is illustrated within a graphical box, though other embodiments are contemplated. As shown in FIG. 2B, each cell, i.e., each status update 216, has vertical and horizontal dimensions that are set by the application program 106 and/or the data rendering module 108. The dimensions of the cells, and therefore the status updates 216, can be consistent with one another, or can be based upon the respective contents of each of the status updates 216. Thus, the dimensions of the status updates 216 may be determined based upon preferences, commands, and/or functions associated with the user, the social networking service, the application program 106, and/or the data rendering module 108. In the illustrated embodiment, the data rendering module 108 analyzes the feed data 116 and formats the status updates 216 after determining the respective contents of each of the status updates 216. Based upon the contents of each of the status updates 216, the dimensions of the status updates 216 are determined, and the status updates 216 are displayed within the illustrated cells.

The cells, i.e., the status updates 216, are arranged on the screen display 200B in a number of columns. In the illustrated embodiment, the status updates 216 are arranged in three columns, although only a portion of the third column is visible in FIG. 2B. It should be understood that the number of columns, as well as the number of status updates 216 that are displayed in each of the columns, may be determined based upon the amount of available display space, by the size of the screen used for a computer display, by the size of the application window used to display the screen display 200B, by a user and/or software preferences, and the like. The width of the columns can be substantially equivalent to the width of the cells, i.e., the status updates 216, whereby each column accommodates one cell across the column width, and one or more cells across the column length. The columns are illustrated and described with reference to FIGS. 3A-3C below.

The status update 216F illustrated in FIG. 2B includes a reference to shared photos, illustrated in the status update 216F as thumbnails 218. It should be understood that this embodiment is exemplary, and is not to be construed as limiting in any way. As shown in FIG. 2B, each of the status updates 216 includes a UI control 220 for displaying a detailed view of the information reflected in the status update 216. The function of the UI control 220, and the detailed view that may be displayed by the computer 102 in response to the selection of the UI control 220, will be described in more detail with reference to FIG. 2C.

The screen display 200B further can include a UI control 222, the selection of which causes the computer 102 to display additional status updates that are not visible. Instead of, or in addition to, the UI control 222, the screen display can include a horizontal scroll bar. The UI controls shown in FIG. 2B are exemplary, and are illustrative of only one contemplated embodiment of the present disclosure.

It can be appreciated by referring collectively to FIGS. 2A and 2B, that in a similar amount of screen "real estate," the screen display 200B displays more of the feed data 116 than was displayed on the screen display 200A. In other words, the screen display 200B leaves less unused display space relative to the screen display 200A. Similarly, it will be appreciated that the status updates 215 of FIG. 2A and the status updates 216 of FIG. 2B include substantially the same content, though additional controls displayed in FIG. 2A may be omitted from the status updates 216 illustrated in FIG. 2B, if desired. In some embodiments, the additional controls illustrated in FIG. 2A are accessible to a user viewing the screen display 200B by way of selecting the UI control 220 to access the detailed view.

Figure 2C:
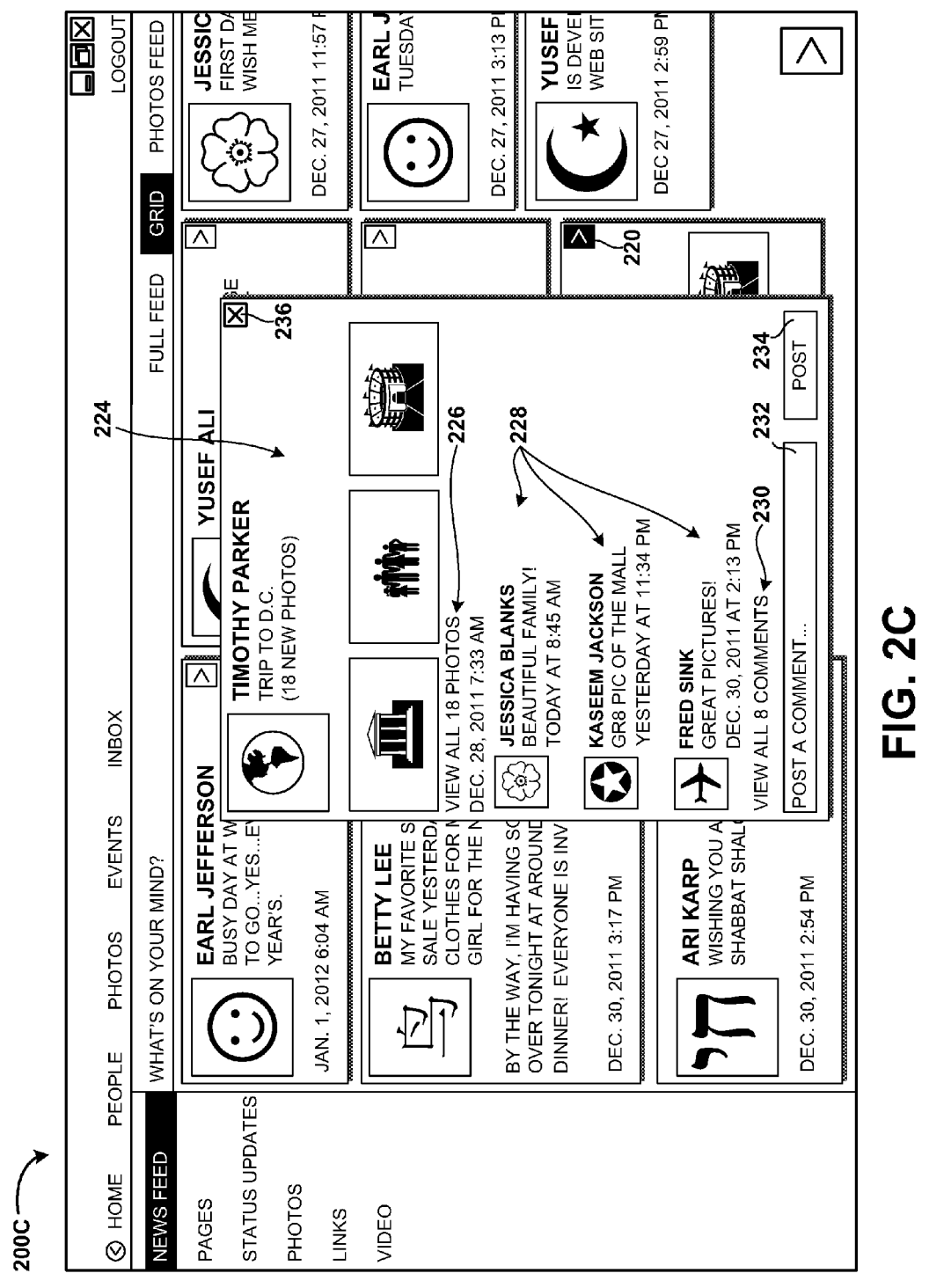

Turning now to FIG. 2C, a user interface diagram showing aspects of a user interface provided by the application program 106 and the data rendering module 108 in one embodiment will be described. In particular, FIG. 2C shows another screen display 200C generated by the application program 106 and the data rendering module 108 according to one particular implementation presented herein. The screen display 200C illustrated in FIG. 2C may include a modification of screen display 200B of FIG. 2B. The screen display 200C can be displayed in response to a user selecting the UI control 220 to display the detailed view of the corresponding status update 216F. As such, the UI control 220 associated with the status update 216F is highlighted, though this is not necessarily the case. As illustrated in FIG. 2C, the screen display 200C includes a details window 224, which includes additional details and information for the corresponding status update 216F, which is obscured in FIG. 2C by the details window 224.

In the illustrated embodiment, the details window 224 includes the posted status update 216F and the thumbnails 218 as described above with reference to FIG. 2B. A UI control 226, the selection of which causes the computer 102 to access additional photos, can be included if desired. Additionally, the details window 224 includes comments 228, which may be submitted by members of a social network of the user who posted the corresponding status update 216F. A UI control 230, the selection of which causes the computer 102 to access additional comments, can be included if desired. In the illustrated embodiment, the details window 224 includes an input field 232. The input field 232 includes a text box for inputting alphanumeric characters corresponding to a comment. The details window 224 includes a UI control 234 that, when selected, causes the computer 102 to post the comment entered in the input field 232, if desired. The details window 224 also may include a UI control 236, the selection of which causes the computer 102 to close the details window 224. It will be appreciated that if a user selects the UI control 236 to close the details window 224, the screen display 200C may be modified by the computer to be substantially similar to the screen display 200B described above with reference to FIG. 2B.

Figure 2D:
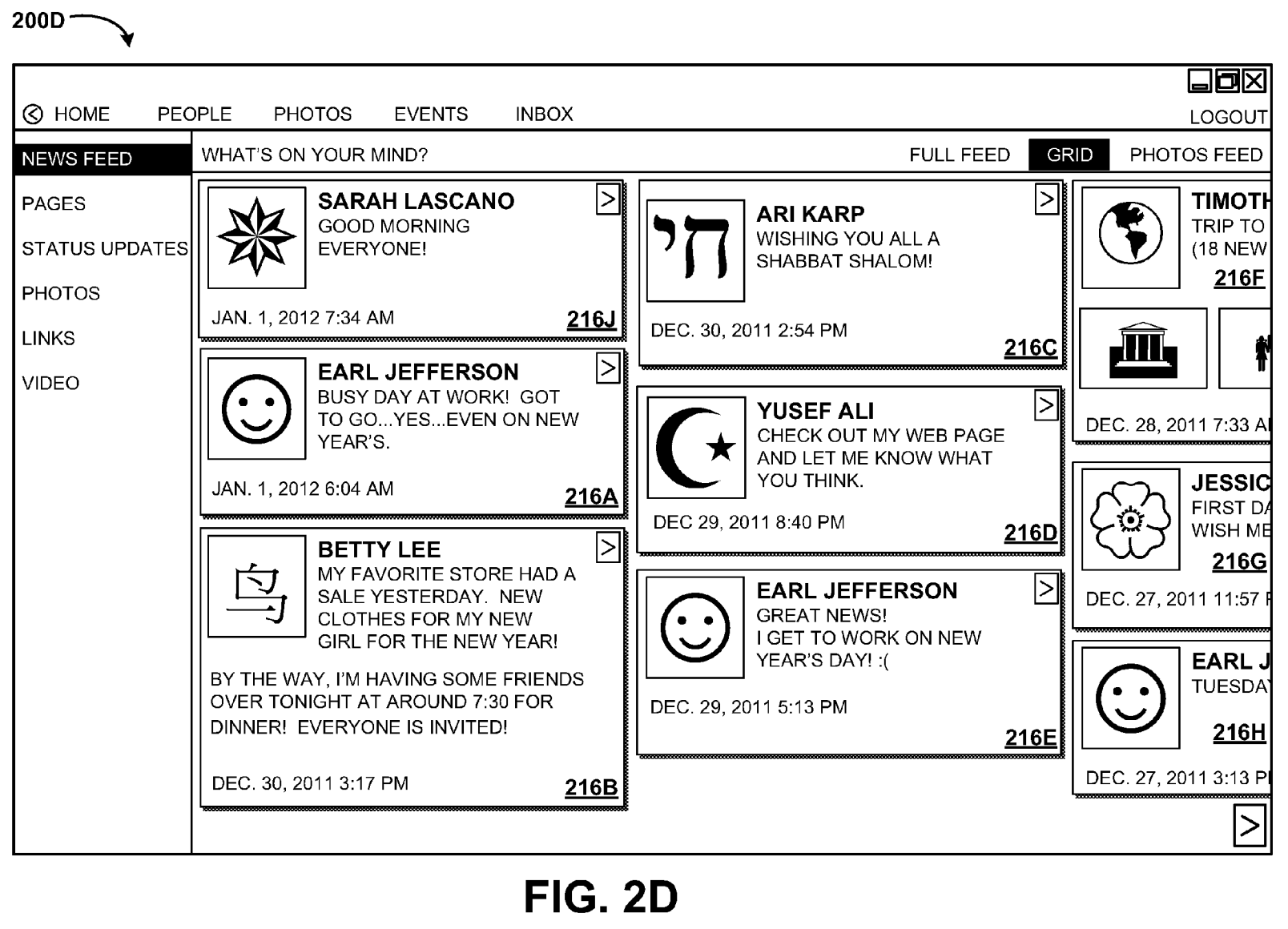

Turning now to FIG. 2D, additional aspects of the present disclosure provided by the application program 106 and the data rendering module 108 in another embodiment will be described. In particular, FIG. 2D shows another screen display 200D generated by the application program 106 and the data rendering module 108. The screen display 200D illustrated in FIG. 2D may include a modification of screen display 200B illustrated in FIG. 2B. More particularly, the screen display 200D can be displayed in response to additional feed data 116 being received at the server 112, and recognized by the computer 102, as will be described below in additional detail.

As illustrated in FIG. 2D, the application program 106 and the data rendering module 108 format the additional feed data 116 and add it to the screen display 200B illustrated in FIG. 2B, resulting in the screen display 200D illustrated in FIG. 2D. In the illustrated embodiment, the additional feed data 116 includes a new cell, i.e., a new status update 216J, which was received after the feed data 116 was retrieved and rendered to generate the screen display 200B. The new status update 216J can be inserted at the portion of the screen display 200D corresponding to the first, or most recent, posted information. It will be understood that in some regions or countries, the top left may correspond to the most recent post, while in other regions or countries, the top right, bottom right, or bottom left may correspond to the most recent post. Thus, it will be understood that the illustrated embodiment is exemplary, and should not be understood to be limiting in any way.

As illustrated above in FIGS. 2B and 2C, a status update 216A was previously illustrated at the portion of the screen display 200D at which the new status update 216J is inserted. Thus, according to exemplary embodiments of the present disclosure, the data rendering module 108 is configured to determine how much space the new status update 216J will consume prior to outputting the data to the application program 106 and/or displaying the new status update 216J. The application program 106 and/or the data rendering module can shift, slide, or otherwise relocate each of the status updates to create a space for the new status update 216J. Thus, the order and orientation of the feed data 116 can be maintained, though shifted a slot to accommodate the new feed data 116. It will be appreciated that the entire screen display 200D can be re-rendered upon determining that a new status update 216J is to be included in the screen display 200D. Thus, the concept of "sliding" and/or "shifting" can be conceptual. In some embodiments, the "sliding" and/or "shifting" occurs in real-time animation, to enhance the user experience and/or to draw attention to the update to the screen display 200D.

Figure 3A:
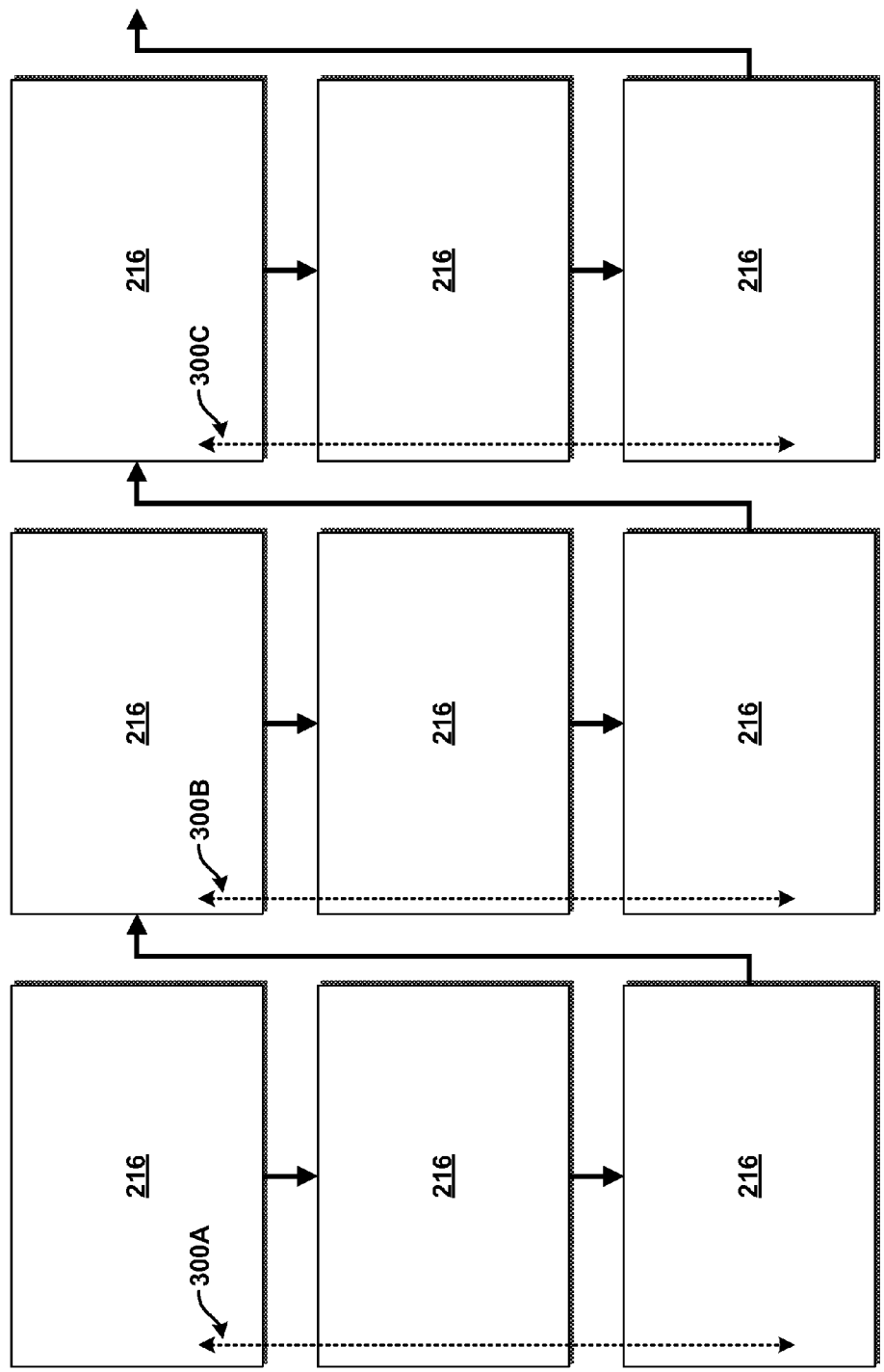
Figure 3B:
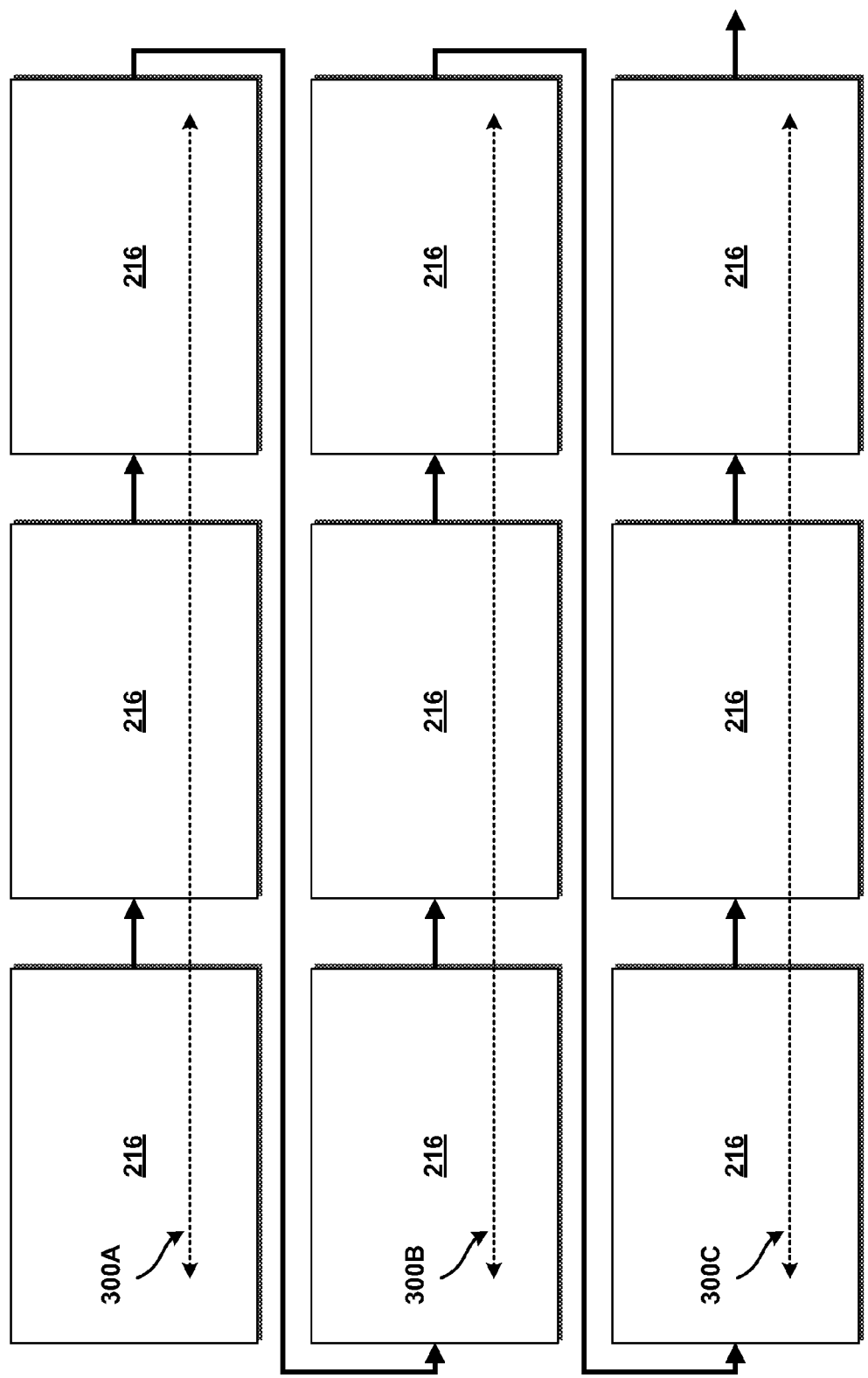

FIGS. 3A-3C schematically illustrate three exemplary embodiments for shifting status updates to accommodate new feed data 216. As mentioned above, the status updates 216 are arranged in a number of columns 300. The status updates 216 can be shifted in several directions, as explained above. In some embodiments, the status updates 216 are shifted toward an end of a column 300, which may be defined by the limit of a display window, a limit of available display space, or another limit. Once the status updates 216 reach the end of a first column 300A, the status updates 216 are moved to the beginning of the next column 300B. It will be appreciated that the columns 300 may be vertically oriented, as is illustrated in FIGS. 3A and 3B, or the columns 300 may be horizontally oriented, as illustrated in FIG. 3B.

As status updates 216 are generated and added to a display, the status updates 216 are shifted to accommodate the newest status updates 216. For example, the status updates 216 can be shifted toward an end of the column 300A. Once the status updates 216 reach the end of the column 300A, the status updates 216 are moved to the next column 300B. As the status updates 216 reach or pass the limit of the available display space, the UI control 222 described above can be rendered to allow a user to view additional display space, if desired. In some embodiments, if the status updates 216 reach or pass the limit of available display space, the feed data 116 corresponding to a status update 216 that reaches or passes the limit of the available display space is discarded, and the status update 216 is no longer displayed. If desired, the feed data 116 and/or the status update 216 can be retrieved if requested by a user. Thus, if the display space is allowed to grow, the display space can be limited to horizontal growth.

Figure 4:
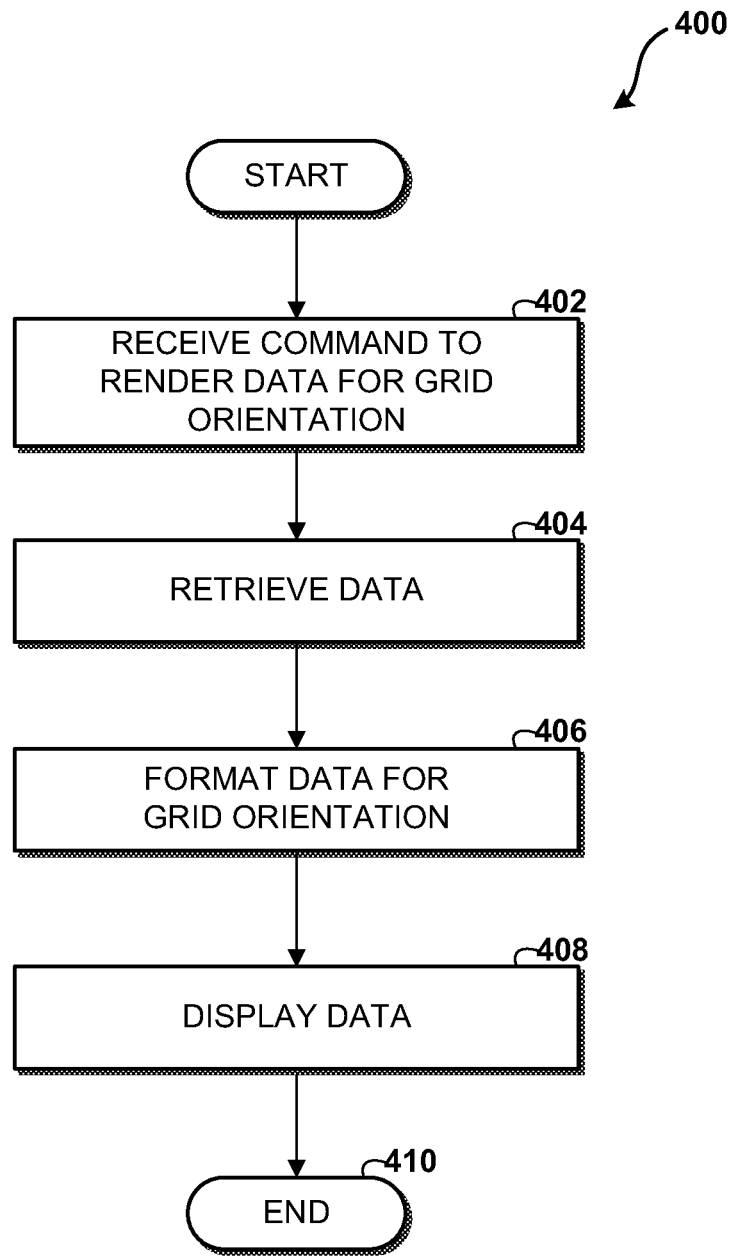
FIG. 4 is a flow diagram showing aspects of a method for displaying feed data, according to an exemplary embodiment of the present disclosure.

Turning now to FIG. 4, a method 400 for displaying the feed data 116 will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. For purposes of illustrating and describing the concepts of the present disclosure, the methods disclosed herein are described as being performed by the computer 102, though it will be understood that the computer 102 can provide the functionality described herein by execution of the application program 106 and/or the data rendering module 108. Similarly, the methods disclosed herein can be provided by the server 112 by execution of the social networking server application 114, wherein the social networking server application 114 includes instructions, the execution of which cause the server 112 to provide the functionality described above with reference to the data rendering module 108. Thus, the described embodiments are merely exemplary and should not be viewed as being limiting in any way.

The method 400 begins at operation 402, wherein the computer 102 receives a command to display feed data 116 in a multidimensional grid orientation. As illustrated and described above, the command to display the feed data 116 in a multidimensional grid orientation can be received in several different ways. For example, a user can enter a command to display the feed data 116 in a multidimensional grid orientation by clicking with a mouse on a UI control such as the UI control 210 illustrated and described with reference to FIG. 2A. Additionally, or alternatively, a user may enter a key sequence entered in an input field or prompt, enter a hot key or keystroke sequence, navigate to or access an address such as a particular uniform resource locator ("URL"), combinations thereof, and the like.

From operation 402, the method 400 proceeds to operation 404, wherein the computer 102 retrieves feed data 116. The operation 404 can include, for example, the computer 102 connecting to the server 112 via the network 110, the computer 102 requesting feed data 116, and the server 112 transmitting, or allowing access to, the requested feed data 116. Although not illustrated, it will be understood that additional steps, e.g., authentication and/or other access control measures, may be performed prior to transmitting data between the computer 102 and the server 112.

From operation 404, the method 400 proceeds to operation 406, wherein the computer 102 formats the feed data 116 for display in a multidimensional grid orientation. As explained above, the computer 102 can determine what portions of the feed data 116 to display in the multidimensional grid orientation. In some embodiments, the computer 102 omits a portion of the feed data 116 if the feed data 116 is to be displayed in the multidimensional grid orientation. In some embodiments, all of the available feed data 116 is presented in the multidimensional grid orientation. Additionally, the operation 406 includes steps for generating UI controls, as illustrated and described above with reference to FIG. 2B, and inserting detailed feed data 116 into a displayable item. The determination as to what feed data 116 to include in the multidimensional grid orientation, if such a determination is made, may be based upon parameters defined by a user, the software, e.g., the application program 106, and/or the data rendering module 108, and/or other entities.

The operation 406 also can include generating UI controls such as, for example, the UI control 220 for displaying a detailed view of feed data 116, UI controls for accessing information included in the feed data 116, and the like. Referring briefly to the embodiment illustrated in FIG. 2B, for example, the operation 406 can include the computer 102 generating code that will execute if the computer 102 receives a command indicating selection of the UI control 220. As mentioned above, additional and/or alternative controls are possible and are contemplated, and therefore may be generated during the operation 406. After formatting the feed data 116 in the desired format, the computer 102 displays the formatted feed data 116 for the user, as illustrated at operation 408. The method 400 ends at operation 410.

Figure 5:
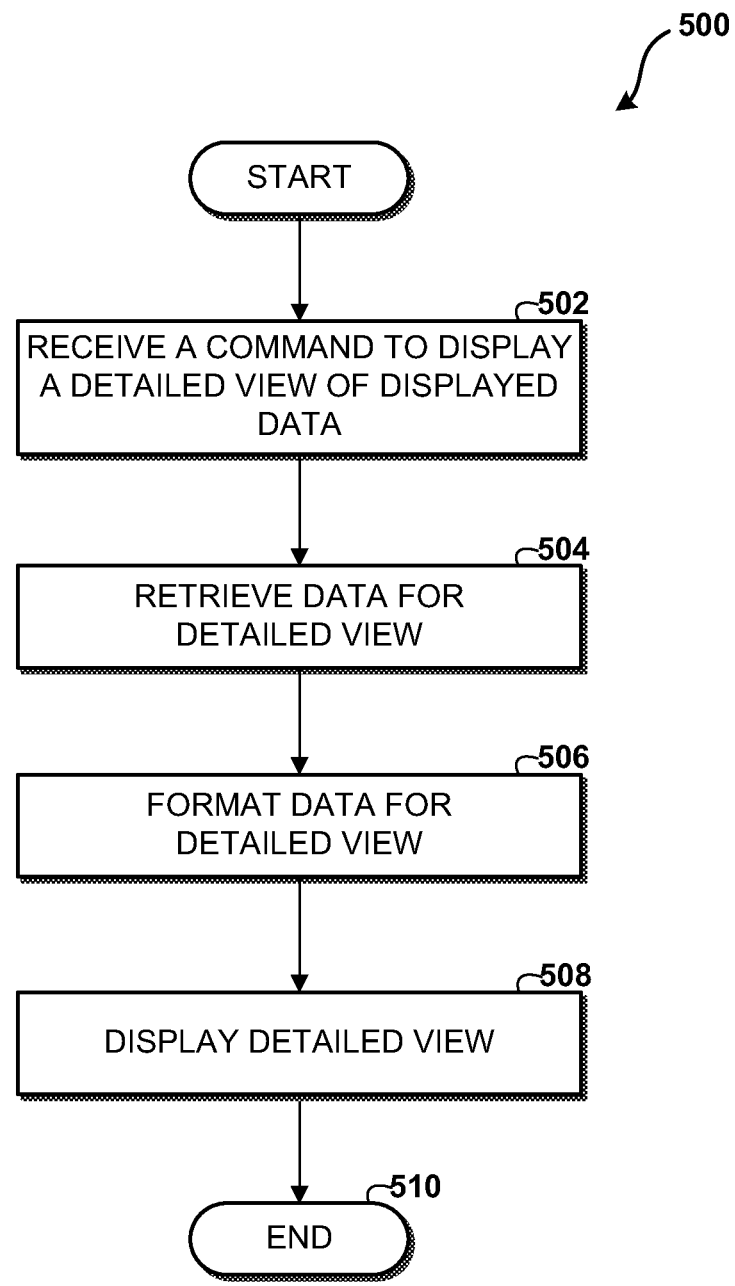
FIG. 5 is a flow diagram showing aspects of a method for displaying a detailed view of displayed feed data, according to an exemplary embodiment of the present disclosure.

FIG. 5 schematically illustrates a method 500 for rendering and displaying a detailed view of displayed feed data 116, according to an exemplary embodiment of the present disclosure. The method 500 begins at operation 502, wherein the computer 102 receives a command to display a detailed view of displayed feed data 116. For purposes of describing the method 500, the displayed feed data 116 will be described as a displayed status update, though the displayed feed data 116 can relate to other data including, but not limited to, photo albums, video links, user information, messaging services, and/or any other desired aspect of the social networking service for which feed data 116 is displayed in an abbreviated or compressed format, and for which a control to access a detailed view is provided.

As illustrated and described above, the command to display the detailed view of the status update can be received in several ways. For example, a user can enter a command to display the detailed view of the status update by clicking with a mouse on a UI control such as the UI control 220 illustrated in FIG. 2B. Additionally, or alternatively, a user may enter a command to display the detailed view of the status update by entering a hotkey, a keystroke sequence, a voice command, and the like.

Upon receiving a command to display the detailed view of the status update, the method 500 proceeds to operation 504, wherein the computer 102 retrieves additional feed data 116 corresponding to details for the status update for which the detailed view was requested. As explained above, the additional feed data 116 can be retrieved from the server 112, for example, via the social networking server application 114 when the application program 106 and/or the data rendering module 108 are activated, or upon receiving the command to display the detailed view. Thus, as mentioned above, in some embodiments, a portion of the feed data 116 is downloaded from the server 112 upon initialization of the application program 106 and/or the data rendering module 108. Upon receiving a command to access a detailed view of the feed data 116, the computer 102 downloads the remainder of the feed data 116, corresponding to the data needed for the detailed view. In some other embodiments, all of the feed data 116 is downloaded to the computer 102, but only a portion of the feed data 116 is displayed, according to parameters specified by or at the application program 106 and/or the data rendering module 108. Therefore, the operation 504 can include the computer 102 communicating with the server 112, the social networking server application 114, and/or a data storage device to retrieve the remainder of the feed data 116.

From operation 504, the method 500 proceeds to operation 506, wherein the computer 102 formats the feed data 116, including the additional feed data 116 retrieved in operation 504, to generate the detailed view for display. The operation 506 can include generating UI controls for the detailed view. With reference to the example illustrated in FIG. 2C, and described with reference thereto, the operation 506 can include formatting the layout and content of the details window 224, generating and formatting the UI controls 226, 230, 234, 236, generating and formatting the comments 228, if any, and generating and formatting additional aspects of the detailed view window such as, for example, the input field 232. If, as illustrated in FIG. 2C, the detailed view relates to feed data 116 including photos, the operation 506 can include formatting the photos for display, which may be based upon preferences, available screen space, and the like.

From operation 506, the method 500 proceeds to operation 508 wherein the computer 102 displays the detailed view of the feed data 116. An exemplary embodiment of operation 508 is illustrated in FIG. 2C and is described above with reference thereto. The method 500 ends at operation 510.

Figure 6:
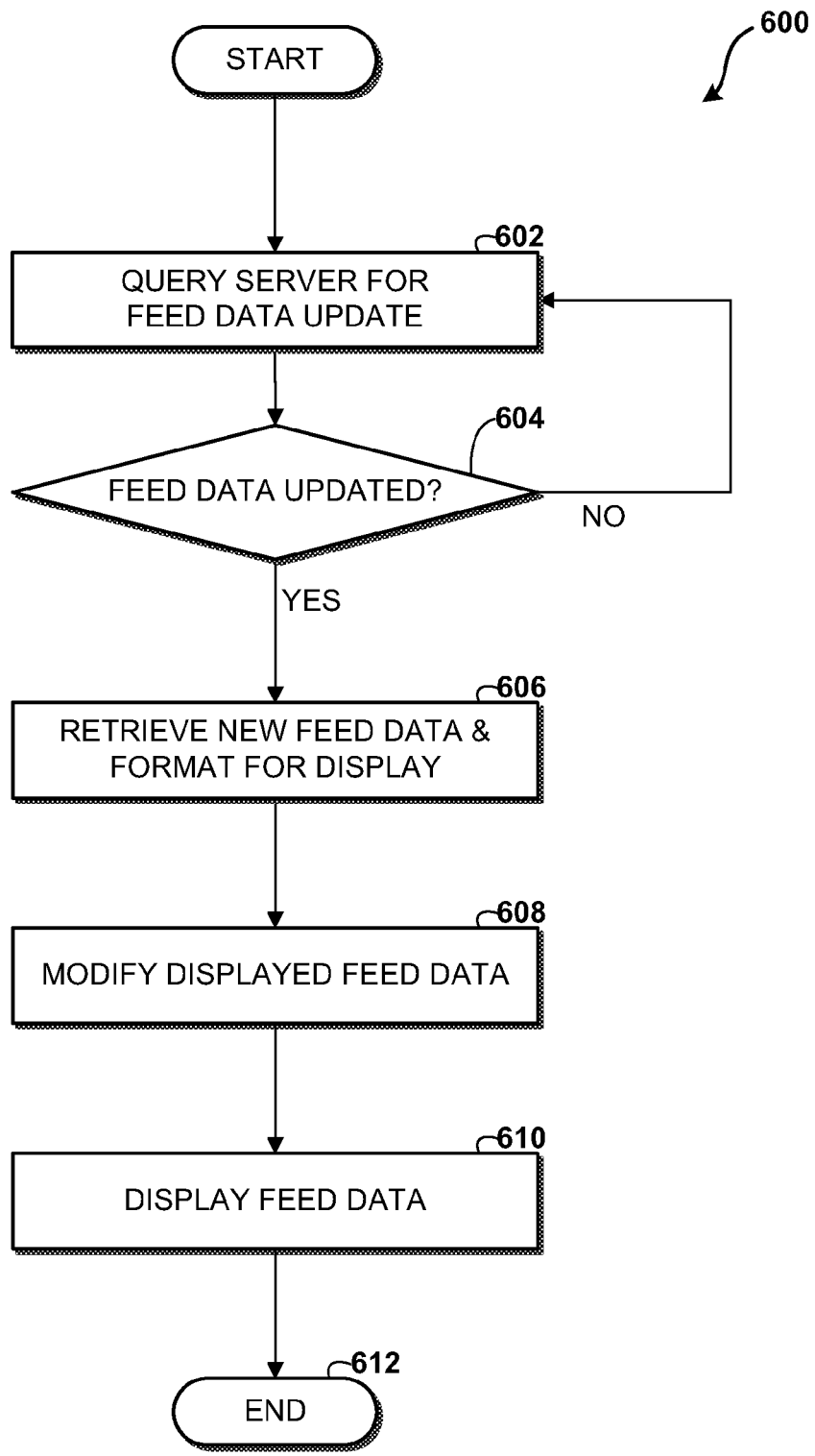
FIG. 6 is a flow diagram showing aspects of a method for dynamically updating displayed feed data, according to an exemplary embodiment of the present disclosure.

FIG. 6 schematically illustrates a method 600 for dynamically updating displayed feed data 116, according to an exemplary embodiment of the present disclosure. The method 600 begins at operation 602, wherein the computer 102 queries the server 112 for new feed data 116. As will be explained below, the query steps described herein with reference to the operation 602 may be omitted, and the server 112 can instead be configured to "push" data updates to the computer 102 or the social networking server application 114 without any action on the part of the computer 102. If the querying step is included, the operation 602 can include the computer 102 receiving a response from the server 112 indicating whether or not any new feed data 116 exists. It should be appreciated that the steps of operation 602 also can be performed based upon a command to "refresh" or "reload" a display of a social networking site, the passage of a specified time, or based upon another trigger or event.

From operation 602, the method 600 proceeds to operation 604, wherein the computer 102 determines if new feed data 116 is available. As illustrated at operation 604, if the computer 102 determines that new feed data 116 is not available, the method 600 returns to operation 602. It should be understood that additional operations such as expiration of a countdown timer, or waiting for entry of a "refresh" or "reload" command at the computer 102, can occur before returning to operation 602. If, at operation 604, the computer 102 determines that new feed data 116 is available, the method 600 proceeds to operation 606.

In operation 606, the computer 102 retrieves the new feed data 116 and formats the new feed data 116 for display at the computer 102. As mentioned above, the query, response, determination, and retrieve operations described with respect to the operations 602, 604, and 606 can be eliminated by configuring the server 112 to "push" new data feed updates to the computer 102 for display. Thus, it will be understood that the method 600 can begin at operation 606 with the computer 102 formatting received new feed data 116 for display at the computer 102.

The method 600 proceeds to operation 608, wherein the computer 102 modifies the displayed feed data 116 to accommodate the display of the new feed data 116. As mentioned above with reference to FIG. 2D, the operation 608 can include shifting status updates, e.g., the status updates 216A-H illustrated in FIG. 2D to create an open space on the display corresponding to a size needed to display the new feed data 116.

The method 600 proceeds to operation 610, wherein the computer 102 displays the new feed data 116. An exemplary embodiment of displaying new feed data 116 is illustrated in FIG. 2D, and described with reference thereto. As shown in FIG. 2D, a new status update 216J is illustrated in a slot corresponding to a most recent post, and the status updates 216A-H previously displayed have been shifted to make room for the new status update 216J. The method 600 ends at operation 612.

It will be appreciated that the method 600 allows dynamic updating of the displayed feed data 116 with new feed data 116, while maintaining all of the displayed feed data 116 in a multidimensional grid orientation. Thus, the method 600 allows a computer 102 to display more data than other possible orientations, without substantially decreasing the amount of relevant data available to a user. Thus, some embodiments of the method 600 allow the computer 102 to provide for efficient use of display "real estate."

Figure 7:
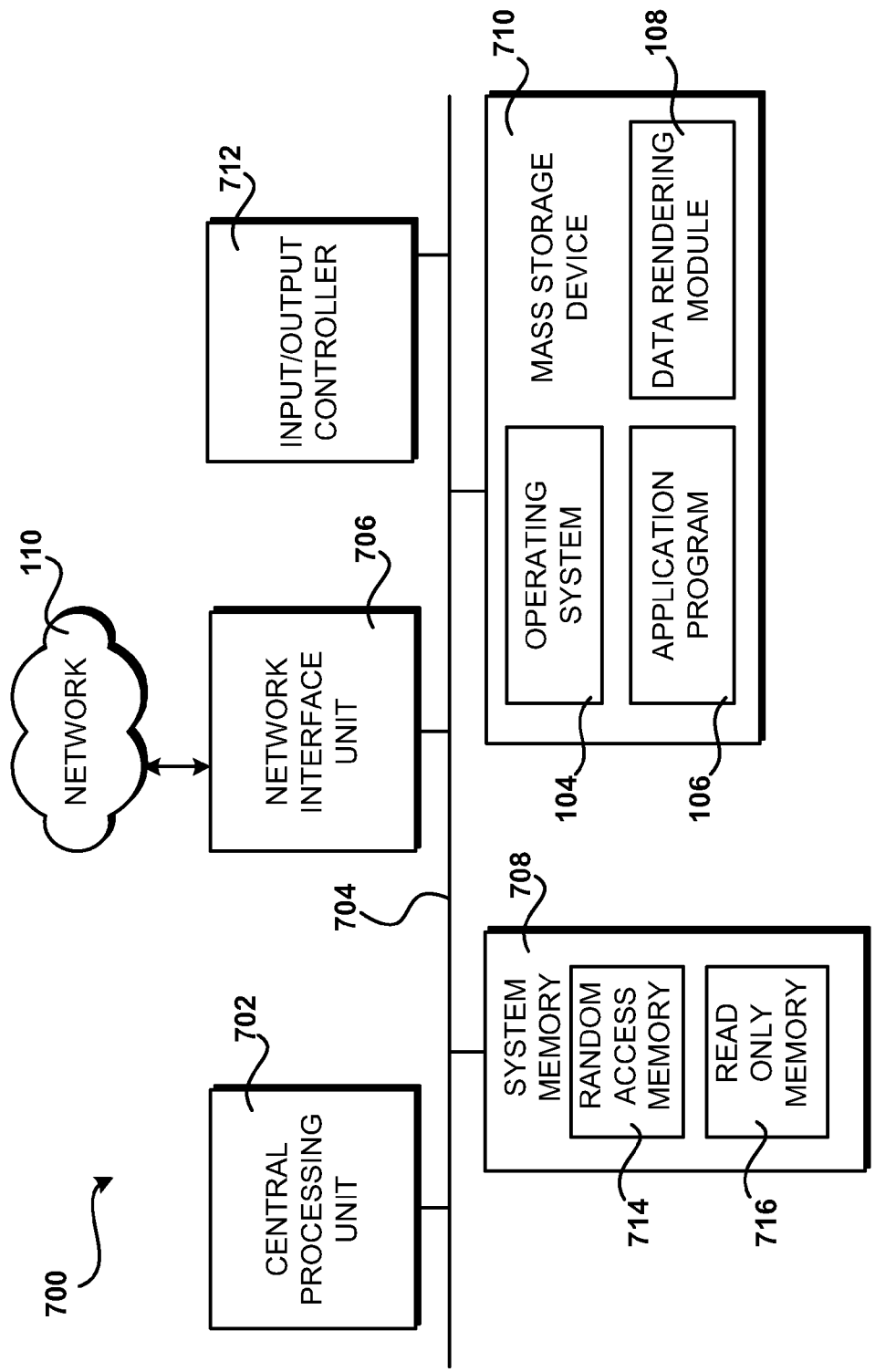
FIG. 7 is a computer architecture diagram illustrating an exemplary computer hardware and software architecture for a computing system capable of implementing aspects of the embodiments presented herein.

FIG. 7 illustrates an exemplary computer architecture 700 for a computer 102 capable of executing the software components described herein for formatting, displaying, and updating feed data 116 as described above. The computer architecture 700 illustrated in FIG. 7 illustrates a conventional desktop, laptop, and/or server computer, and may be utilized to execute any aspects of the software components presented herein, including the application program 106, the data rendering module 108, and/or the social networking server application 114.

The computer architecture 700 illustrated in FIG. 7 includes a central processing unit 702 ("CPU"), a system memory 708, including a random access memory 714 ("RAM") and a read-only memory ("ROM") 716, and a system bus 704 that couples the memory to the CPU 702. A basic input/output system containing the basic routines that help to transfer information between elements within the computer architecture 700, such as during startup, is stored in the ROM 716. The computer architecture 700 further includes a mass storage device 710 for storing an operating system 104, application programs, e.g., the application program 106, and program modules, e.g., the data rendering module 108, which are described in greater detail herein.

The mass storage device 710 is connected to the CPU 702 through a mass storage controller (not shown) connected to the bus 704. The mass storage device 710 and its associated computer-readable media provide non-volatile storage for the computer architecture 700. Although the description of computer-readable media contained herein refers to a mass storage device, such as a hard disk or CD-ROM drive, it should be appreciated by those skilled in the art that computer-readable media can be any available computer storage media that can be accessed by the computer architecture 700.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700.

According to various embodiments, the computer architecture 700 may operate in a networked environment using logical connections to remote computers through a network such as the network 110. The computer architecture 700 may connect to the network 110 through a network interface unit 706 connected to the bus 704. It should be appreciated that the network interface unit 706 also may be utilized to connect to other types of networks and remote computer systems. The computer architecture 700 also may include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the computer architecture 700, including the operating system 104 suitable for controlling the operation of a networked desktop, laptop, or server computer. The mass storage device 710 and RAM 714 also may store one or more program modules. In particular, the mass storage device 710 and the RAM 714 may store the data rendering module 108 and the application program 106. The mass storage device 710 and the RAM 714 also may store other types of program modules and data.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

Additional features are contemplated, but have not been described above for the sake of brevity. For example, the data rendering module 108 can be configured to recognize multiple events or other data items that are associated with a single member of a user's social network. According to some embodiments, the data rendering module 108 generates a UI control, the selection of which causes the computer to "collapse" the multiple events or other data items into a single event or data item that is expandable in a manner similar to the display of the details window 224 discussed with reference to FIG. 2C. In such an embodiment, a single status update is presented for a member of the user's social network, and the UI control for viewing all of that member's events is presented with the single status update. Upon selection of the UI control, a window is generated and displayed with the details of the other data events, or the corresponding status updates are formatted and displayed in their proper locations in the multidimensional grid orientation view, e.g., the view described in FIG. 2B. It will be appreciated that multiple "shifts" and/or "slides" of other feed data 116 may be executed, as described with reference to FIG. 2D.

Additionally, it should be understood that the embodiments illustrated and described herein may include the use of filtering to restrict the visible feed data 116. For example, a user can restrict the feed data 116 by groups, thereby filtering out feed data 116 associated with members not in the chosen groups. Additionally, a user can filter feed data 116 based upon time restrictions, thereby filtering out feed data 116 that does not meet the specified time restrictions. It is also contemplated that a provider of the social networking service can sell advertising space in the feed data 116, and place advertising in the feed data 116 for display by the computer 102. In some embodiments, the advertising information is randomly placed in the feed data 116.

Finally, while the UI control 220 is illustrated in FIG. 2B as being generated for each status update, it should be understood that this is not necessarily the case. In some embodiments, the data rendering module 108 analyzes the feed data 116 and determines if a status update corresponding to the feed data 116 has additional relevant information that will not be displayed in full. An example of such an occurrence is illustrated and described with respect to the status update 216F of FIG. 2B. If, however, no such data is recognized in the feed data 116, or the status update generated by the data rendering module 108, the UI control 220 may be omitted, providing an additional visual cue to a user that a particular status update or other information includes or does not include additional relevant data that is not immediately visible.

Based on the foregoing, it should be appreciated that technologies for displaying and updating feed data have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for displaying feed data, the computer-implemented method comprising performing computer-implemented operations for:
   receiving, at a computer executing a data rendering module, feed data comprising status updates received from a social networking service;
   formatting, by the computer, a plurality of vertically oriented cells to display the feed data, each of the plurality of vertically oriented cells being formatted to display one of the status updates received from the social networking service;
   displaying, by the computer, the plurality of cells in a plurality of columns; and
   upon receiving new feed data comprising a further status update received from the social networking service
      formatting, by the computer, a new cell to display the further status update, shifting, by the computer, a displayed cell vertically toward a bottom of a first column in which the displayed cell is displayed, the bottom of the first column corresponding to a vertical limit of available display space, if the displayed cell reaches the end of the first column, shifting, by the computer, the displayed cell to a beginning of a next column of the plurality of columns, and displaying, by the computer, the new cell in the first column.

2. The method of claim 1, further comprising:
displaying a user interface control within a one of the plurality of cells;
receiving a selection of the user interface control; and
displaying a detailed view of a status update corresponding to the one of the plurality of cells in response to the selection.

3. The method of claim 1, wherein shifting the displayed cell to the vertical limit of the available display space comprises shifting the displayed cell to a vertical limit of a display window displayed on a computer display.

4. The method of claim 1, wherein shifting the displayed cell to the vertical limit of the available display space comprises shifting the displayed cell to a vertical limit of a computer display displaying the plurality of cells.

5. The method of claim 1, wherein shifting the displayed cell to the beginning of the next column of the plurality of columns comprises shifting the displayed cell to a top of the next column of the plurality of columns.

6. The method of claim 5, further comprising:
if at least a portion of the displayed cell is shifted past a horizontal limit of the available display space, rendering a user interface control for accessing additional display space.

7. The method of claim 6, further comprising:
receiving a selection of the user interface control; and
displaying the additional display space in response to the selection.

8. The method of claim 5, further comprising:
if the top of the next column of the plurality of columns is past a horizontal limit of the available display space, discarding the feed data corresponding to the displayed cell.

9. A computer-implemented method for rendering and displaying feed data comprising status updates associated with a social networking service, the computer-implemented method comprising performing computer-implemented operations for:

receiving, at a computer executing a data rendering module, a command to render the feed data, the feed data comprising data associated with a social networking account of a user;

in response to receiving the command to render the feed data, retrieving the feed data from a server associated with the social networking service;

executing a data rendering module to format a plurality of cells to display the feed data for display in a multidimensional grid orientation comprising a plurality of columns, wherein at least two of a plurality of cells are displayed in a horizontal orientation relative to one another in a first horizontal column of the plurality of columns, each of the plurality of the cells being formatted to display one of the status updates;

generating a user interface control for display with at least one of the plurality of cells, wherein selection of the user interface control causes the computer to display a detailed view of a status update associated with the at least one of the plurality of cells;

displaying the plurality of cells and the user interface control in the multidimensional grid orientation;

receiving new feed data;

generating a new cell comprising a portion of the new feed data;

shifting the at least one of the plurality of cells horizontally from a first position to a second position;

placing the new cell at the first position; and if the at least one of the plurality of cells reaches the end of the first horizontal column of the plurality of columns, shifting the at least one of the plurality of cells to a beginning of a next horizontal column of the plurality of columns.

10. The method of claim 9, further comprising
receiving new feed data comprising a further status update associated with the social networking service;
formatting a new cell to display the further status update;
shifting the plurality of cells to create an open display space to accommodate the new cell; and
displaying the new cell at the open display space, wherein the open display space comprises a position indicating that the further status update associated with the new cell is the most recently received status update displayed.

11. A computer-readable storage medium having computer-readable instructions stored thereupon that, when executed by a computer, cause the computer to:

receive a command to render feed data associated with a social networking service, the feed data comprising status updates associated with a social networking account of a user;

in response to receiving the command to render the feed data, retrieve the feed data from a server hosting the social networking service;

format the feed data for display in a multidimensional grid orientation by generating a plurality of cells arranged in a plurality of columns, wherein at least two of the plurality of cells are displayed in a horizontal orientation relative to one another in a first horizontal column of the plurality of columns, each of the plurality of cells being formatted to display one of the status updates;

generate a user interface control for display with at least one of the plurality of cells, wherein selection of the user interface control causes a computer to display a detailed view of the status update associated with the at least one of the plurality of cells;

display the plurality of cells and the user interface control in the multidimensional grid orientation;

receive new feed data comprising a further status update associated with the social networking service;

format a new cell to display the further status update;

modify the displayed feed data by shifting the at least one of the plurality of cells horizontally from a first position to a second position to create an open display space to accommodate the new cell;

display the new cell at the open display space, wherein the open display space comprises a position indicating that the further status update associated with the new cell is the most recently received status update being displayed; and if the at least one of the plurality of cells reaches the end of the first horizontal column of the plurality of columns, shifting the at least one of the plurality of cells to a beginning of a next horizontal column of the plurality of columns.

* * * * *